United States Patent
Arden et al.

(10) Patent No.: US 7,993,207 B2
(45) Date of Patent: Aug. 9, 2011

(54) VEHICLE JOINT DESIGN UTILIZING BIPODE ELEMENT

(75) Inventors: Tony N. Arden, Rochester Hills, MI (US); Samuel J. Oram, Rochester Hills, MI (US); Steven L. Leffingwell, White Lake, MI (US); Noel W. Sutton, Auburn Hills, MI (US); Thomas C. Walbridge, Bloomfield Hills, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 452 days.

(21) Appl. No.: 12/183,337

(22) Filed: Jul. 31, 2008

(65) Prior Publication Data
US 2010/0029394 A1    Feb. 4, 2010

(51) Int. Cl.
*F16D 3/205* (2006.01)
(52) U.S. Cl. .................................................. 464/121
(58) Field of Classification Search ............. 403/383; 464/11, 112, 115, 120, 121, 123, 119, 122, 464/132, 170, 171, 905, 111; 81/177.75
See application file for complete search history.

(56) References Cited

U.S. PATENT DOCUMENTS

| | | | | |
|---|---|---|---|---|
| 1,010,060 A * | 11/1911 | Loomis | ........................ | 464/115 |
| 1,237,135 A | 8/1917 | Wood | | |
| 1,543,575 A * | 6/1925 | Kishline | ....................... | 464/171 |
| 1,887,106 A | 11/1932 | Shierk | | |
| 2,263,279 A | 11/1941 | Seib | | |
| 2,891,392 A * | 6/1959 | Wildhaber | ..................... | 464/123 |
| 3,008,311 A * | 11/1961 | Mazziotti | ....................... | 464/123 |
| 3,098,365 A | 7/1963 | Pearson | | |
| 3,406,534 A | 10/1968 | Chapper | | |
| 3,609,994 A | 10/1971 | Colletti | | |
| 3,922,883 A | 12/1975 | Bevacqua | | |
| 4,114,401 A | 9/1978 | Van Hoose | | |
| 4,145,896 A * | 3/1979 | Pringle | ......................... | 464/123 |
| 4,775,355 A * | 10/1988 | Mizukoshi | .................... | 464/123 |
| 5,213,546 A * | 5/1993 | Schneider | ..................... | 464/132 |
| 5,256,107 A * | 10/1993 | Matsumoto et al. | .......... | 464/111 |
| 5,417,612 A * | 5/1995 | Ide | ................. | 464/120 |
| 5,538,473 A * | 7/1996 | Busch et al. | .................. | 464/111 |
| 5,733,197 A * | 3/1998 | Bartlett | ......................... | 464/123 |
| 5,820,468 A | 10/1998 | Duditza | | |
| 5,868,625 A | 2/1999 | Heier et al. | | |
| 5,935,009 A * | 8/1999 | Hosdez et al. | ................ | 464/111 |
| 5,951,401 A * | 9/1999 | Kita et al. | ..................... | 464/120 |
| 6,390,926 B1 * | 5/2002 | Perrow | ......................... | 464/905 |
| 6,926,612 B2 * | 8/2005 | Wang et al. | ................... | 464/170 |
| 2005/0170898 A1 * | 8/2005 | Mochinaga et al. | | |
| 2005/0288106 A1 * | 12/2005 | Gehrke | ......................... | 464/123 |
| 2006/0067737 A1 * | 3/2006 | Yamazaki et al. | ............ | 464/121 |

* cited by examiner

*Primary Examiner* — Gregory Binda
*Assistant Examiner* — Josh Skroupa
(74) *Attorney, Agent, or Firm* — Jennifer M. Brumbaugh; Mick A. Nylander; Rader, Fishman & Grauer PLLC

(57) ABSTRACT

A vehicle joint assembly is provided comprising an outer race having an outer surface and an inner surface. A pair of opposed slot tracks are formed in the inner cup surface and each comprise a track top wall and two track sidewalls. A barshaft is in communication with a bipod element comprised of a body portion and two opposed peg portions. Each of the two opposed peg portions comprises two opposed curved engagement surfaces engaging one of the track sidewalls. The bipod element is positioned within the outer race such that each of the opposed peg portions resides in one of the opposed slot tracks. The bipod element is capable of being positioned in a variety of angles within the slot tracks and is capable of plunging within the slot tracks.

18 Claims, 3 Drawing Sheets

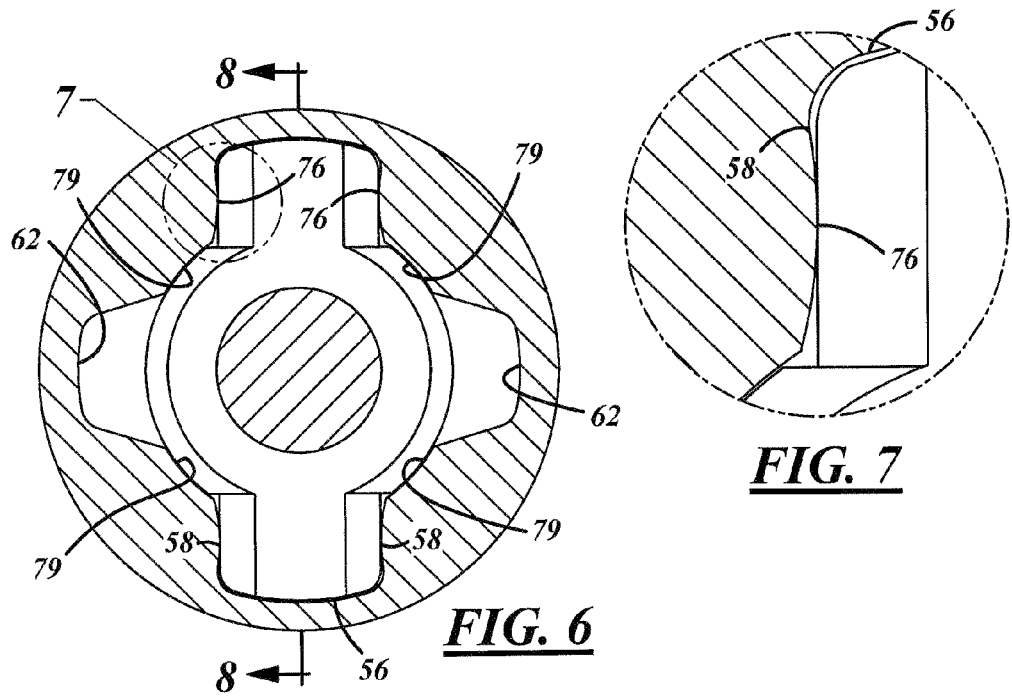
*FIG. 6*
*FIG. 7*
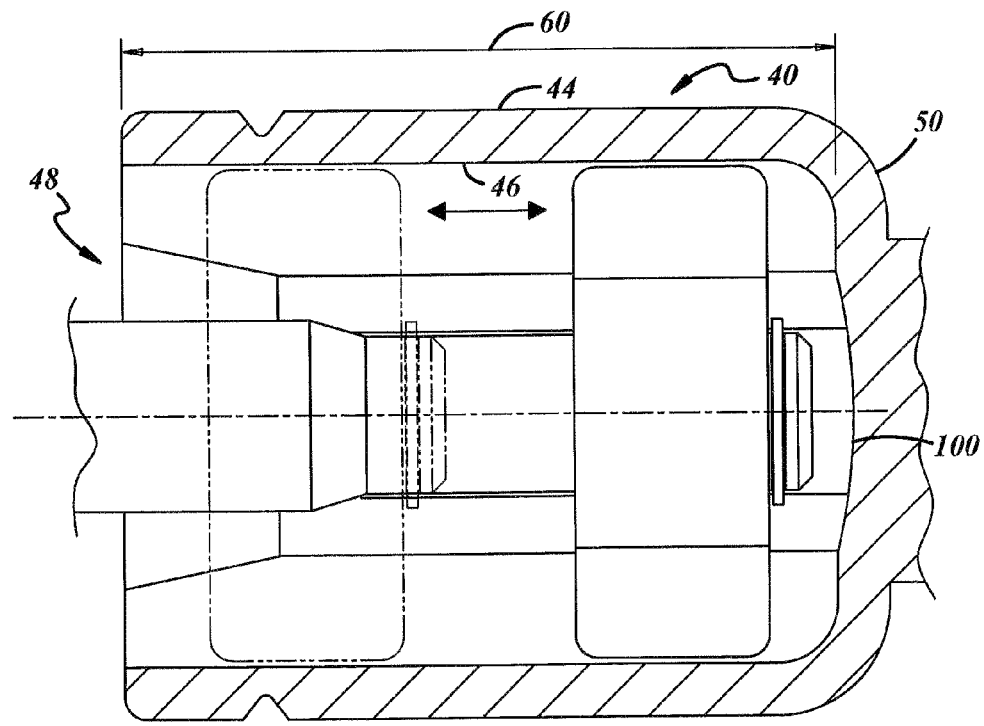
*FIG. 8*

VEHICLE JOINT DESIGN UTILIZING BIPODE ELEMENT

TECHNICAL FIELD

The present invention relates generally to motor vehicle joints, and more particularly concerns a vehicle joint design incorporating a bipode element.

BACKGROUND

Connection shafts, drive units and joints are common components in vehicles. The drive unit typically has an output shaft or an input shaft for receiving a joint. Typically, the drive unit is an axle, transfer case, transmission, power take-off unit or other torque device, all of which are common components in automotive vehicles. Typically, one or more joints are assembled to the shaft to form a propeller or drive shaft assembly. It is the propeller shaft assembly which is connected, for instance, at one end to the output shaft of a transmission and, at the other end, to the input shaft of a differential. The shaft is solid or tubular with ends adapted to attach the shaft to an inner race assembly of the joint thereby allowing an outer race connection to a drive unit. The inner race assembly of the joint is typically press-fit, splined, or pinned to the shaft making the outer race of the joint available to be bolted or press-fit to a hub connector, flange or stubshaft of the particular drive unit. At the other end of the propeller shaft, the same typical or traditional connection is made to a second drive unit when connecting the shaft between the two drive units. Optionally, the joint may be coupled to a shaft for torque transfer utilizing a direct torque flow connection.

In many off road vehicle environments considerable torque is applied through both the various shafts as well as their respective joints. All Terrain Vehicles and Utility Vehicles often have drivelines that are subject to unusually high torque values during unusual or extreme events. These events often arise when the vehicle lands after jumping off irregular terrain. The impact upon landing generates considerable torque in the drivelines. This torque is typically subsequently imparted into the individual components of the joint. When the torque imparted into the joint components exceeds design considerations, the components can experience failure. A common design response to these extreme conditions has been to increase the size of the joint components in order to increase their maximum torque weathering capacity.

In addition to the extreme conditions, designers are utilizing higher capacity engines in vehicle designs. These higher capacity engines increase the power passed through the drivelines and therefore increase the overload torques experienced during extreme conditions. Existing methods of compensation require continued upsizing of the drivelines in order to accommodate the increased power and resulting increased overload torques. Continued upsizing, however, results in increases in mass of the driveline components with subsequent mass increases to the vehicle itself. Upsizing, therefore, poses undesirable restrictions on vehicle designers.

Therefore, joints within these off-road vehicles must be designed to be very robust. In addition, the design configuration of many off-road vehicles requires these joints to operate through large angles. Common constant velocity joint design, incorporating ball elements between the inner and outer races, add increased expense to the vehicle production costs when they must be designed for both robust environments and high angle capacities.

It would be advantageous to have a joint design that provided a capacity to withstand robust environments, could handle high angle scenarios, and could accomplish these tasks with a decrease in complexity and its associated cost reductions.

SUMMARY OF THE INVENTION

A vehicle joint assembly is provided comprising an outer race having an outer surface and an inner surface. A pair of opposed slot tracks are formed in the inner cup surface and each comprise a track top wall and two track sidewalls. A barshaft is in communication with a bipod element comprised of a body portion and two opposed peg portions. Each of the two opposed peg portions comprises two opposed curved engagement surfaces engaging one of the track sidewalls. The bipod element is positioned within the outer race such that each of the opposed peg portions resides in one of the opposed slot tracks. The bipod element is capable of being positioned in a variety of angles within the slot tracks and is capable of plunging within the slot tracks.

The present invention has advantages by providing an extremely robust and cost effective joint design while providing the operation angle and plunge capabilities commonly associated with more complex and costly designs. The present invention itself, together with further intended advantages, will be best understood by reference to the following detailed description and taken in conjunction with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

FIG. 6 is a cross-sectional illustration of the vehicle joint assembly illustrated in FIG. 3.

FIG. 7 is a detail illustration of a portion of the cross-sectional illustration shown in FIG. 6, the detail illustrating the track sidewalls.

FIG. 8 is a cross-sectional illustration of the vehicle joint assembly illustrated in FIG. 6.

DETAILED DESCRIPTION

In the following description, various operating parameters and components are described for one or more constructed embodiments. These specific parameters and components are included as examples and are not meant to be limiting.

While the invention is described with respect to a vehicle joint assembly for use in an all-terrain vehicle, the following apparatus is capable of being adapted for various purposes including automotive applications, motor systems that use joints, or other vehicles and non-vehicle applications which utilize robust joints with large angle and plunging capabilities.

Figure 1:
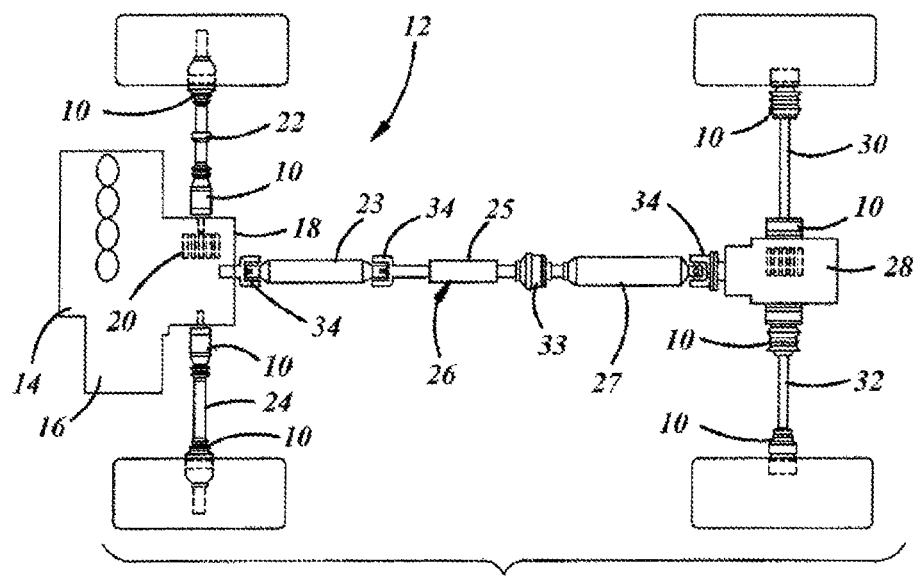
FIG. 1 shows a plan view of an exemplary drive system for a typical 4-wheel drive vehicle wherein the present invention may be used to advantage.

An exemplary drive system 12 for a typical 4-wheel drive vehicle is shown in FIG. 1. While a 4-wheel drive system is shown and described, the concepts herein presented could apply to a single drive unit system or multiple drive unit system, including rear wheel drive only vehicles, front wheel drive only vehicles, all wheel drive vehicles, and four wheel drive vehicles. In this example, the drive system 12 includes an engine 14 that is connected to a transmission 16 and a power take-off unit 18. A front differential 20 has a right hand side half shaft 22 and left hand side half shaft 24 each of which are connected to a wheel and deliver power to the wheels. On both ends of the right hand side half shaft 22 and left hand side half shaft 24 are vehicle joints 10. A propeller shaft 26 connects the front differential 20 to a rear differential 28 wherein the rear differential 28 includes a rear right hand side shaft 30 and a rear left hand side shaft 32, each of which ends with a wheel on one end thereof. Vehicle joints 10 are located on both ends of the half shafts 30, 32 that connect to the wheels and the rear differential 28. In one embodiment, the propeller shaft 26 is a three-piece propeller shaft that includes a plurality of cardan joints 34 and one high-speed constant velocity joint 33. In other embodiments, it is contemplated that the propeller shaft 26 may be one or more pieces. The propeller shaft 26 includes interconnecting shafts 23, 25, 27. The vehicle joints 10 transmit power to the wheels through the propeller shaft 26 even if the wheels or the propeller shaft 26 have changed angles due to steering, raising or lowering of the suspension of the vehicle. Some of the vehicle joints 10 may be any of the standard types known, such as a plunging tripod, a cross groove joint, a fixed ball joint, a fixed tripod joint, or a double offset joint, all of which are commonly known terms in the art for different varieties of vehicle joints 10. The joints 10 must allow for transmission of constant velocities at angles typically encountered in the off road travel of all-terrain vehicles in both the half shafts, interconnecting shafts and propeller shafts of these vehicles. The vehicle joint 10 contemplated by the present invention, however, is a novel joint that has the capacity to withstand robust environments, can handle high angle scenarios, and allows for plunging.

Figure 2:
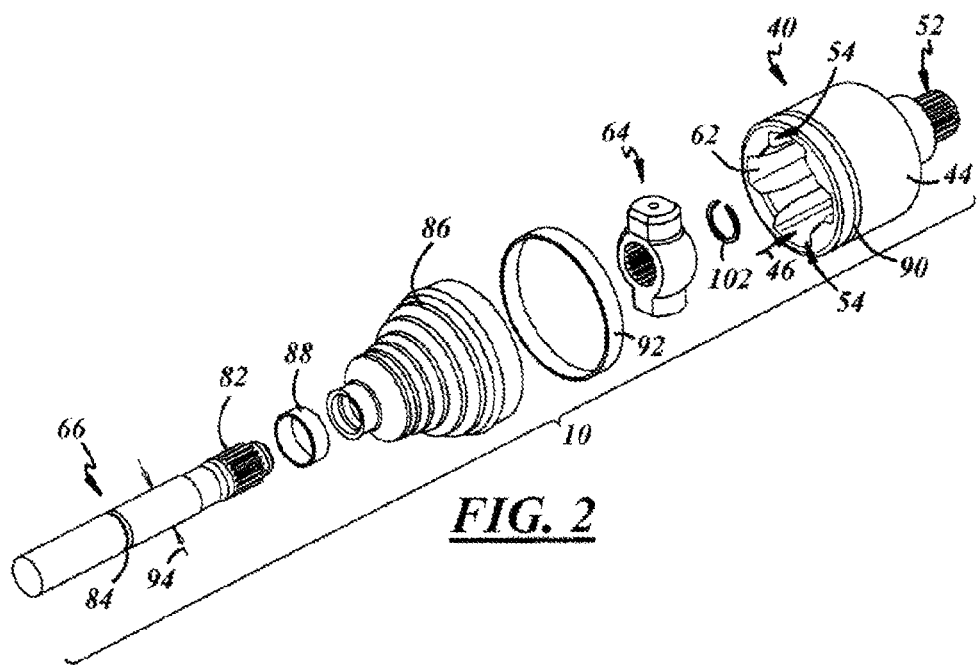
FIG. 2 shows an exploded view of a vehicle joint assembly in accordance with the present invention.
Figure 3:
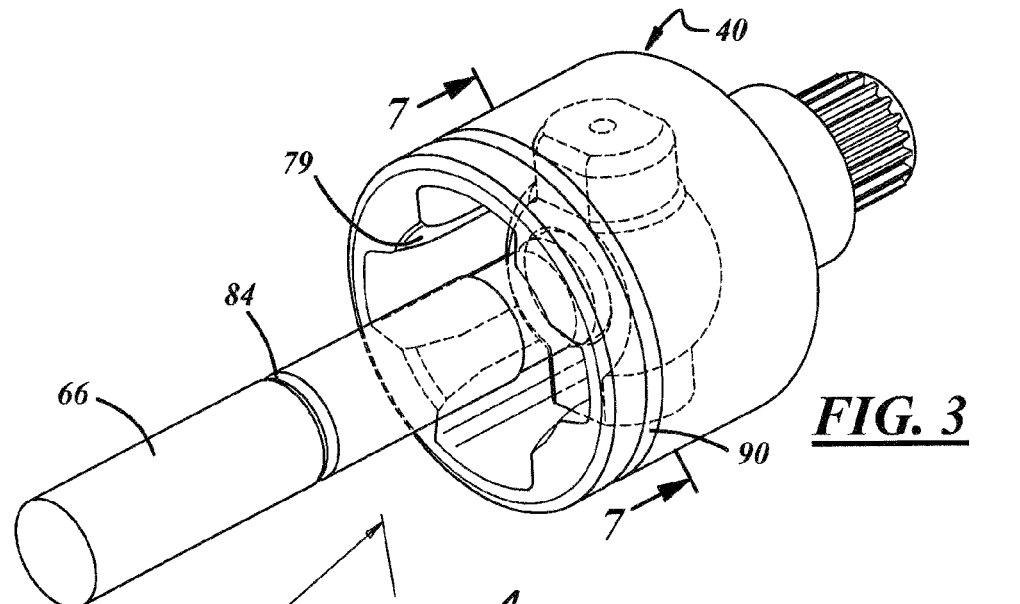
FIG. 3 is an assembled view of the vehicle joint assembly illustrated in FIG. 2.
Figure 4:
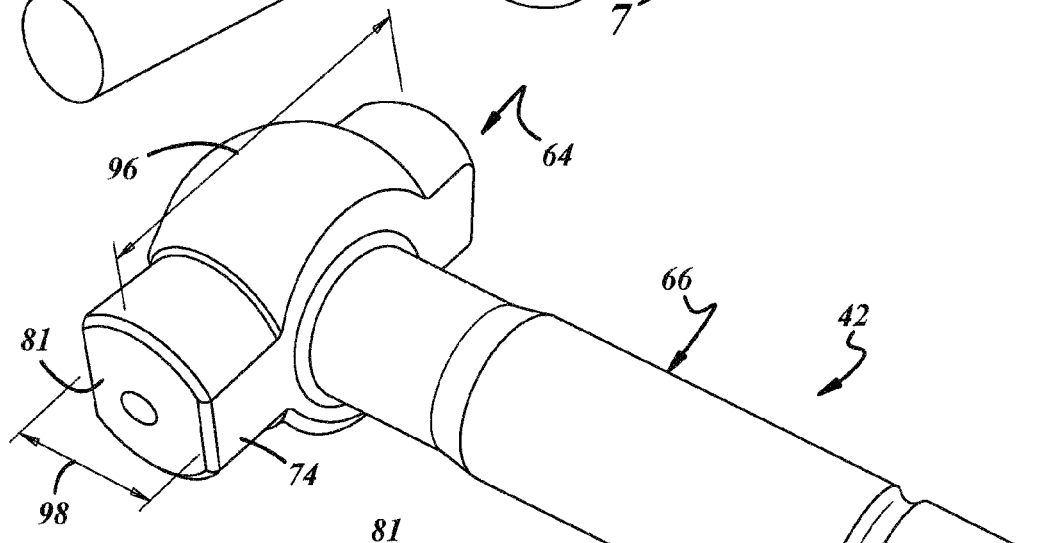
FIG. 4 is a detailed view of the Bipode Element/Shaft assembly member illustrated in FIG. 2.

The vehicle joint assembly 10, contemplated by the present invention is illustrated in FIG. 2. The vehicle joint assembly 10 is comprised of an outer race 40 and a bipode element 64 (see FIG. 4). The outer race 40 is preferably cup-shaped and is comprised of an outer cup surface 44 and an inner cup surface 46 forming an open front face 48 and a closed rear face 50. A splined outer race shaft 52 may optionally extend from the closed rear face 50 for assisting mounting the outer race 40 to a driving element such as the front differential 20. The outer race 40 has a pair of opposed slot tracks 54 formed on the inner cup surface 46. In one embodiment, these slot tracks 54 are forged. Each of these slot tracks 54 is comprised of a track top wall 56 and two track sidewalls 58. The track top wall 56 is preferably curved. In at least one embodiment, see FIG. 7, it is contemplated that the two track sidewalls 58 are convex such that they protrude towards each other. The track sidewalls 58 have a track length 60 configured to provide plunging capabilities. The track length 60 is preferably configured to provide at least 30 mm of plunge depth. One skilled in the art upon reading this disclosure would understand that the plunge depth is a function of both the track length 60 as well as the dimensions of the Bipode Element/Shaft assembly 42 as will be discussed below. The outer race 40 also may include a plurality of weight saving tracks 62 positioned between the slot tracks 54. Although two weight saving tracks 62 are illustrated, it should be understood that the present invention contemplates a varying number and varying shape of weight saving tracks 62.

Figure 5:
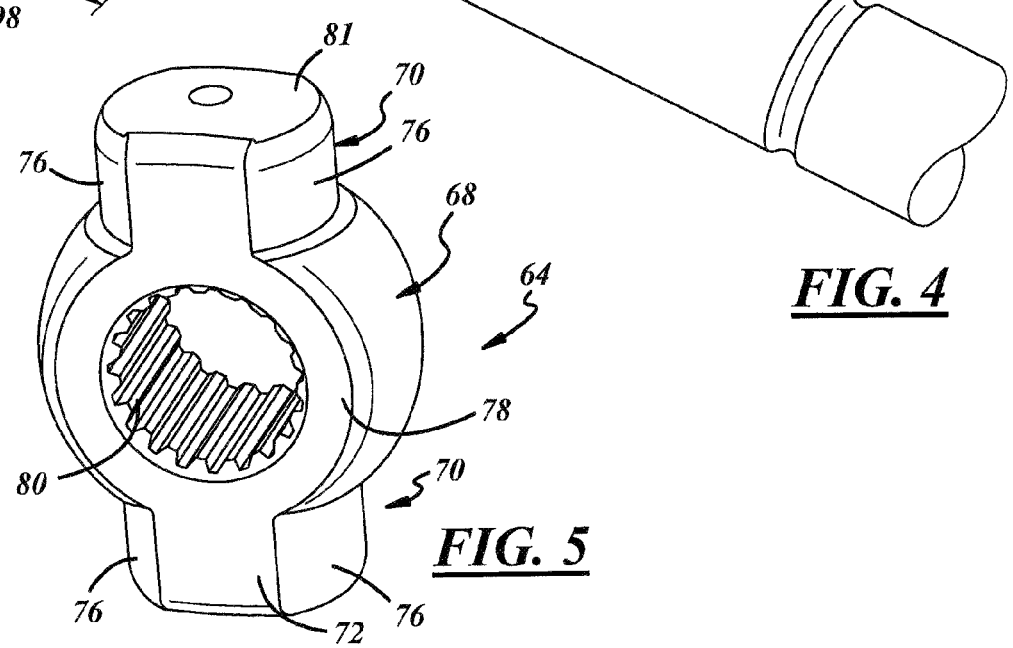
FIG. 5 is a detailed view of the bipode element portion of the Bipode Element/Shaft assembly member illustrated in FIG. 4.

It is contemplated that the bipode element 64 may be forged or machined. The bipode element, as detailed in FIG. 5, is comprised of a body portion 68 and two opposed peg portions 70. The two opposed peg portions 70 are preferably in the shape of a shaved cylinder or similar shape wherein the peg portions 70 have a flat forward surface 72, a flat rear surface 74, and two opposed curved engagement surfaces 76. The bipode element 64 is configured to fit within the slot tracks 54 such that the curved engagement surfaces 76 are engaged by the convex track sidewalls 58. This ensures proper contact between the bipode element 64 and the outer race 40 throughout a variety of angles while maintaining a reduced weight for the bipode element 64. The body portion 68 is preferably comprised of a circular center base 78 having a splined female center 80. The splined female center 80 is configured to engage a splined male extension 82 of the barshaft 66. The circular center base 78 is supported by curved inner support sidewalls 79 positioned between the slot tracks 54 and the weight saving tracks 62 such that the bipode curved tips 81 need not be in contact with the track top wall 56.

The barshaft 66 may additionally comprise at least one barshaft bootseal groove 84 for housing a boot 86 and inner bootclamp 88. Similarly, the outer cup surface 44 may include an outer bootseal groove 90 for housing the boot 86 and an outer bootclamp 92. The barshaft 66 is comprised of a barshaft diameter 94. Similarly, the bipode element 64 comprises a bipode diameter 96 and bipode width 98. The ratio of said barshaft diameter 94 to said bipode diameter 96 is preferably such that the Bipode Element/Shaft assembly 42 may achieve at least a 30 degree operating angle relative to the outer race 40. In one such embodiment, it is contemplated that the ratio of said barshaft diameter 94 to said bipode diameter 96 is approximately 1:2. It is further contemplated that the track length 60 and bipode width 98 are such that the minimum 30 mm plunge may be achieved. Finally, a clearance depression 100 may be formed on the inner cup surface 46 between the slot track 54 to account for protrusion of the barshaft 66 through the bipode element 64 at full plunge depth (see FIG. 8). A circlip 102 may be used to affix the bipode element 64 to the barshaft 66.

The present invention provides a vehicle joint 10 that is extremely robust and as such is highly beneficial to off-road usage. The vehicle joint 10 also has low complexity which translates into improved cost savings as well as improved production times. Finally, the present invention combines the robustness and low complexity with high angle operation capacity as well as plunge depth such that a novel and improved vehicle joint 10 is achieved.

From the foregoing, it can be seen that there has been brought to the art a new and improved automotive joint assembly with improved robustness, plunging and high angle capacities, and cost effective design. While the invention has been described in connection with one or more embodiments, it should be understood that the invention is not limited to those embodiments. On the contrary, the invention covers all alternatives, modifications, and equivalents as may be included within the spirit and scope of the appended claims.

What is claimed is:
1. A vehicle joint assembly comprising:
   a cup-shaped outer race comprising an outer cup surface and an inner cup surface, said outer cup surface and said inner cup surface forming an open front face and a closed rear face;
   a pair of opposed slot tracks formed in said inner cup surface, each of said opposed slot tracks comprising a track top wall and two track sidewalls, wherein said two track sidewalls comprise convex surfaces facing each other;

a bipod element comprising a body portion and two opposed peg portions, each of said two opposed peg portions comprising the general shape of a shaved cylinder having a flat forward surface, a flat rear surface, and two opposed curved engagement surfaces, wherein said curved engagement surfaces engage said track sidewalls formed in said inner cup surface; and a barshaft in communication with said bipod element;

wherein said bipod element is positioned within said cup-shaped outer race such that each of said opposed peg portions resides in one of said opposed slot tracks, said bipod element and said cup-shaped outer race forming a variable angle joint with plunging capabilities.

2. The vehicle joint assembly according to claim 1 wherein:

said bipod element comprises a bipod diameter, said barshaft comprises a barshaft diameter; and the ratio of said bipod diameter to said barshaft diameter is approximately 2:1.

3. The vehicle joint assembly according to claim 1 wherein:

said bipod element comprises a bipod diameter, said barshaft comprises a barshaft diameter; and the ratio of said bipod diameter to said barshaft diameter allows said barshaft to achieve at least a 30 degree angle while positioned in said cup-shaped outer race.

4. The vehicle joint assembly according to claim 1 wherein said cup-shaped outer race comprises:

a plurality of weight saving tracks formed in said inner cup surface.

5. The vehicle joint assembly according to claim 1, wherein said bipod element comprises:

a circular center base having a splined female center; and wherein said barshaft comprises a splined male extension engaging said splined female center.

6. The vehicle joint assembly according to claim 1, wherein said curved engagement surfaces engage said convex surfaces.

7. The vehicle joint assembly according to claim 1, wherein said inner cup surface further comprises a plurality of curved inner support sidewalls; and said bipod element is supported and centered within said outer race by said curved inner support sidewalls.

8. A vehicle joint assembly comprising:

an outer race comprising an outer surface and an inner surface;

a pair of opposed slot tracks formed in said inner surface, each of said opposed slot tracks comprising a track top wall and two track sidewalls, wherein said two track sidewalls comprise convex surfaces facing each other;

a bipod element comprising a body portion and two opposed peg portions, each of said two opposed peg portions comprising a flat forward surface, a flat rear surface and two opposed curved engagement surfaces, each of said two opposed curved engagement surfaces engaging one of said track sidewalls formed in said inner surface of said outer race; and a barshaft in communication with said bipod element;

wherein said bipod element is positioned within said outer race such that each of said opposed peg portions resides in one of said opposed slot tracks, said bipod element capable of being positioned in a variety of angles within said slot tracks, said bipod element capable of plunging within said slot tracks.

9. The vehicle joint assembly according to claim 8 wherein:

said bipod element comprises a bipod diameter, said barshaft comprises a barshaft diameter; and the ratio of said bipod diameter to said barshaft diameter allows said barshaft to achieve at least a 30 degree angle while positioned in said cup-shaped outer race.

10. The vehicle joint assembly according to claim 8 wherein said outer race further comprises:

a plurality of weight saving tracks formed in said inner cup surface, said weight saving tracks positioned between said opposed slot tracks.

11. The vehicle joint assembly according to claim 8, wherein:

said bipod element comprises a base having a splined female center; and said barshaft comprises a splined male extension engaging said splined female center.

12. The vehicle joint assembly according to claim 8, wherein said opposed slot tracks comprise:

a slot track length configured to provide at least 30 mm of plunge.

13. The vehicle joint assembly according to claim 8, wherein said outer race comprises an outer cup surface and an inner cup surface, said outer cup surface and said inner cup surface forming an open front face and a closed rear face, and further comprising:

a boot sealing said outer cup surface to said barshaft.

14. The vehicle joint assembly according to claim 13, wherein said outer race further comprises:

an outer race shaft protruding from said closed rear face.

15. The vehicle joint assembly according to claim 13, wherein said outer race further comprises:

a clearance depression formed on said inner cup surface in between said two track sidewalls.

16. The vehicle joint assembly according to claim 8, wherein said inner cup surface further comprises a plurality of curved inner support sidewalls; and said bipode element is supported and centered within said outer race by said curved inner support sidewalls.

17. A method of transferring drive in a vehicle comprising:

providing torque to a barshaft in communication with a bipod element, said bipod element comprising a body portion and two opposed peg portions, each of said two opposed peg portions comprising the general shape of a shaved cylinder having a flat forward surface, a flat rear surface, and two opposed curved engagement surfaces; and transferring torque from said barshaft through said bipod element to an outer race by way of said bipod element being positioned within said outer race such that each of said opposed curved engagement surfaces of said opposed peg portions resides in one of a pair of opposed slot tracks formed into the inner surface of said outer race, such that said curved engagement surfaces engage a track sidewall, said bipod element and a cup-shaped outer race forming a variable angle joint with plunging capabilities;

wherein each of said opposed slot tracks comprise a track top wall and two track sidewalls, said two track sidewalls comprise convex surfaces engaging said curved engagement surfaces.

18. A method according to claim 17, wherein said bipod element comprises a bipod diameter, said barshaft comprises a barshaft diameter; and the ratio of said bipod diameter to said barshaft diameter allows said barshaft to achieve at least a 30 degree angle while positioned in said cup-shaped outer race; and wherein said bipod element is capable of being positioned in a variety of angles within said slot tracks, said bipod element capable of plunging at least 30 mm within said slot tracks.

* * * * *